United States Patent

[11] 3,578,815

[72] Inventor William D. Mundinger
Highland; Ernest J. Nagy, Munster, Ind.
[21] Appl. No. 763,745
[22] Filed Sept. 30, 1968
[45] Patented May 18, 1971
[73] Assignees Pullman, Incorporated
Chicago, Ill.

[54] MATERIAL DISCHARGE ARRANGEMENT FOR HOPPER STRUCTURES
14 Claims, 8 Drawing Figs.
[52] U.S. Cl............................................. 302/52,
222/193, 222/545, 105/282, 105/308
[51] Int. Cl.................................................. B65g 53/40
[50] Field of Search........................................ 105/282,
308, 309, 310; 302/52; 222/193, 506, 545

[56] References Cited
UNITED STATES PATENTS
3,393,017 2/1968 Smith............................ 302/52
3,446,538 5/1969 Danielson..................... 302/52

Primary Examiner—Stanley H. Tollberg
Assistant Examiner—H. S. Lane
Attorneys—Hilmond O. Vogel and Wayne Morris Russell ABSTRACT: A discharge arrangement for hopper structures including a sliding gravity gate which is movable to open and closed positions relative to the hopper structure with the gate being movable by a manually operable mechanism. A pneumatic discharge pan is positioned beneath the gate and may be selectively interconnected by an indexing arrangement with the gate to move therewith to the open and closed positions. The manually selectable indexing arrangement by movement of a single rotating shaft is adapted to connect the discharge pan to the gate for movement therewith, to lock the pan in position underneath the discharge opening of a hopper with the gate moved to an out-of-the-way position, and to lock both the gate and the discharge pan in a closed position.

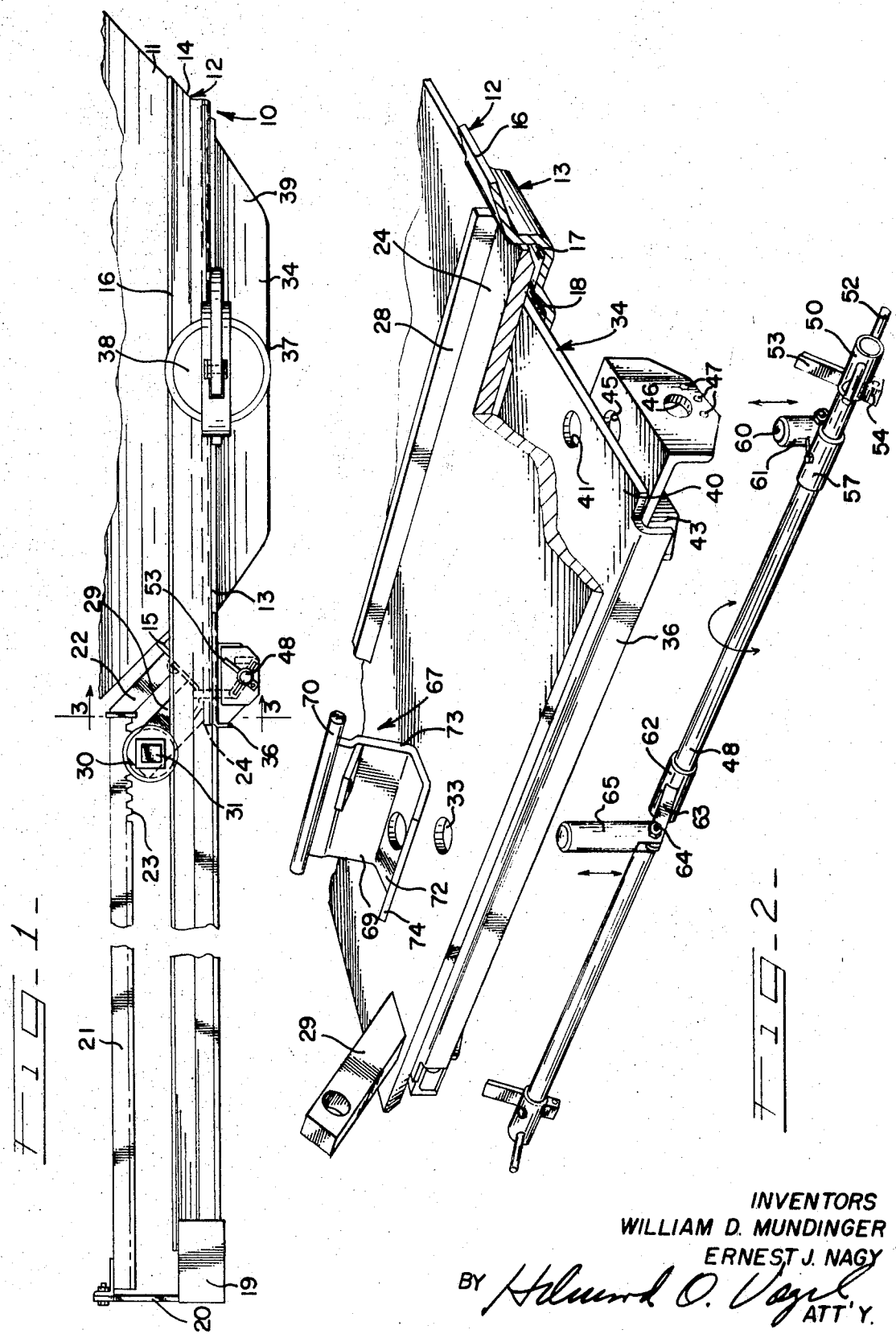

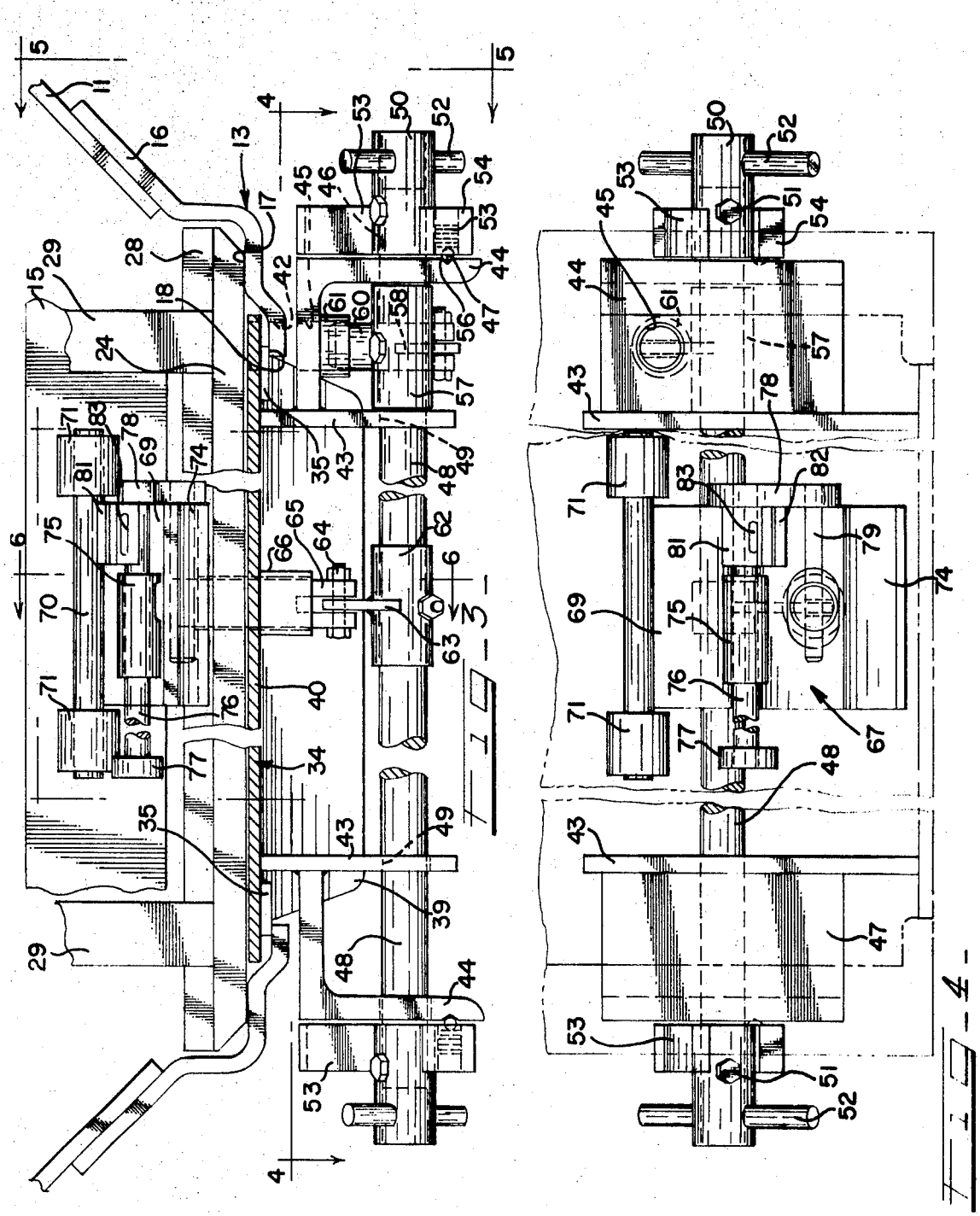

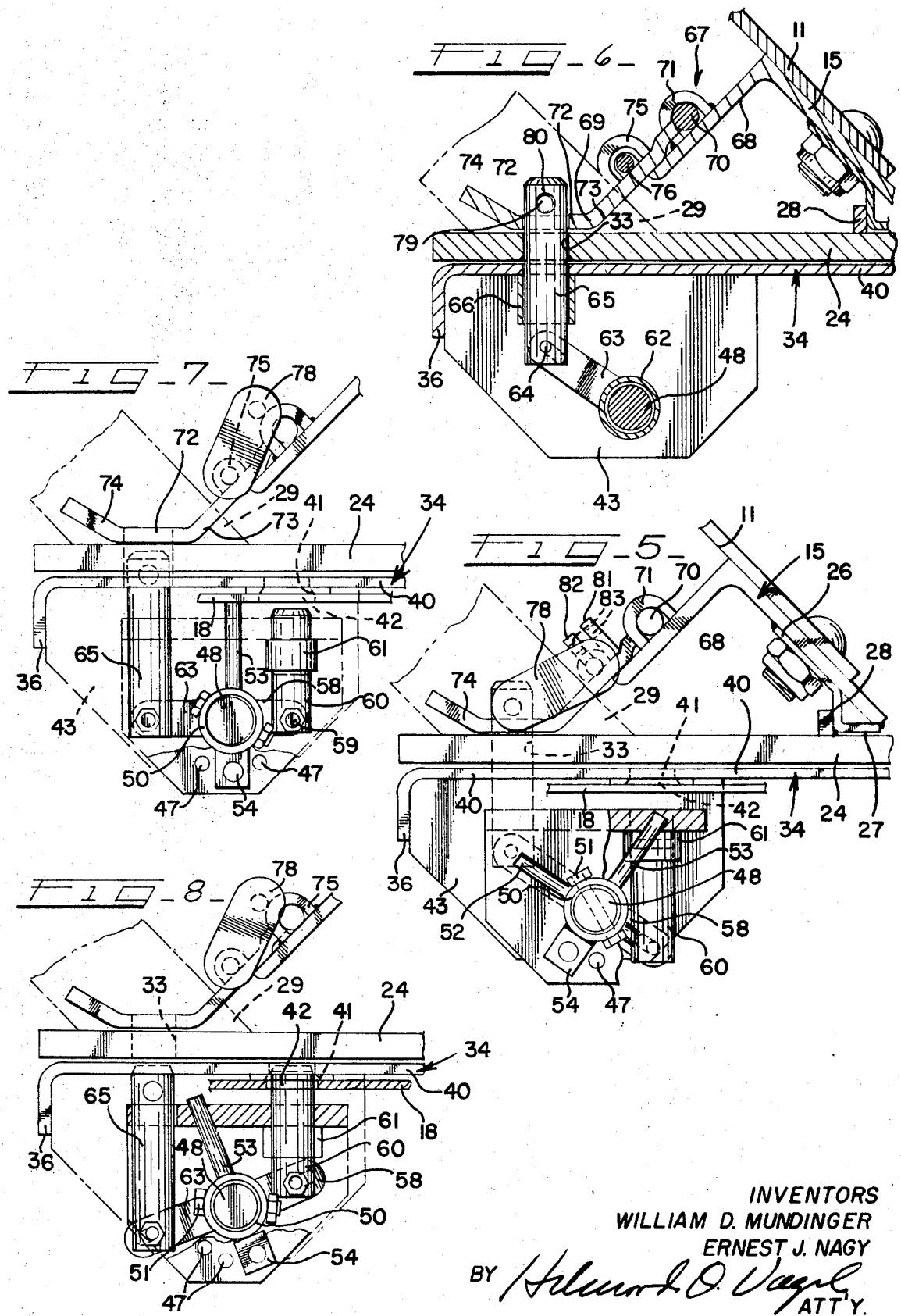

MATERIAL DISCHARGE ARRANGEMENT FOR HOPPER STRUCTURES

BACKGROUND OF THE INVENTION

1. Field of the Invention

The invention relates to the art of discharge mechanisms for vehicle hopper structures which have outlets at their lower ends for the discharge of materials. Such mechanisms are generally used in railway hopper cars and the structure utilized contains both a sliding gate which is movable for discharge of materials by gravity and a pneumatic discharge pan which may be positioned so that materials may be pneumatically withdrawn from the interior of the hopper.

2. Description of the Prior Art

The prior art includes structures wherein a gravity gate includes a mechanism which withdraws the gate to permit gravity discharge. A sanitary pan may be positioned beneath the gravity gate and upon withdrawal of the gravity gate the pan is also moved by the gate to an open position. Thus simultaneous movement of a gravity gate and a closure member beneath the discharge opening of a hopper structure are old in the art. This is further exemplified by structures as shown in the Campbell U.S. Pat. No. 1,342,091 wherein an upper and a lower gate include interconnecting linkage mechanisms which permit simultaneous opening of both closures to the open position. It is broadly old in the field of closure members to utilize the structure shown in the Kraemer U.S. Pat. No. 1,931,661 wherein a closure member in the form of a window may be selectively connected to a window guard for moving both to open and closed positions.

SUMMARY

The invention is concerned primarily with a hopper gate discharge structure wherein a gravity gate is moved by a manually operable mechanism and a pneumatic discharge pan is disposed beneath the gravity gate and may be selectively indexed for movement therewith, or into a lock position independent of the gravity gate, or connected to the gravity gate for a transport and closed position relative to the discharge hopper. The selective indexing means requires only the rotation of a single shaft to accomplish the different desired positions.

BRIEF DESCRIPTION OF THE DRAWINGS

FIG. 1 is a side elevational view of a hopper structure having a bottom outlet and discharge structure therefor;

FIG. 2 is an exploded perspective view of a portion of a gravity gate, a hopper discharge structure, and an index mechanism supported on a pneumatic material discharge member;

FIG. 3 is a cross-sectional view taken substantially along the line 3–3 of FIG. 1;

FIG. 4 is a cross-sectional view taken substantially along the line 4–4 of FIG. 3;

FIG. 5 is a side elevational view with portions broken away, taken along the line 5–5 of FIG. 3;

FIG. 6 is a cross-sectional view taken substantially along the line 6–6 of FIG. 3;

FIG. 7 is a side elevational view, with portions broken away, similar to FIG. 5 showing a certain position of an indexing mechanism; and FIG. 8 is a view similar to FIG. 7 showing another position of an indexing mechanism.

DESCRIPTION OF THE PREFERRED EMBODIMENT

A hopper discharge arrangement is designated in FIG. 1 by the reference character 10 and includes a hopper 11. One or more hoppers 11 may be suitably supported on a vehicle such as a railway car for containing and transporting granulated bulk and other similar materials. The arrangement 10 includes a frame 12 having side frame members 13, a front frame member 14 connected thereto, and a rear frame member 15, such frame members generally being disposed in a rectangular configuration underneath a discharge opening provided at the bottom of the hopper 11. The side and front frame members, respectively 13 and 14, include diverging flanges 16 which are suitably connected to the walls of the hopper 11. The side frame members 13 each also include an upper track 17 and a lower track 18. The side frame members 13 extend rearwardly where they are connected to a transversely extending supporting structure 19 which includes an upright bracket 20 supporting racks 21 which are connected at their forward ends to brackets 22 supported on the rear frame member 15. Each rack includes rack teeth 23.

A gravity gate is designated at 24. An angle bracket 26 is supported on the hopper 11 and on the rear frame member 15 and includes a portion providing the upper end of a transversely extending vertical opening 27. As best indicated in FIG. 5 the gate 24 is movable through the opening 27 and as shown in FIG. 3 slides on the track 17 provided by each side frame member 13. In the closed position of the gate 24 as best shown in FIGS. 5 and 6 a transversely extending seal member 28 projects upwardly from the gate 24 and suitably closes the opening 27 against the entrance of foreign materials or the escape of transported materials from the hopper 11. A pair of upwardly inclined brackets 29 have connected thereto pinions 30 which are rotatable by an operating shaft 31 rotatably mounted on the brackets 29 so that upon rotation of such shaft 31 the pinions 30 and rack teeth 23 cooperate to move the gate 24 from open to closed positions. The gate 24 is also provided with a vertical opening generally designated at 33 as best shown in FIGS. 5 and 6.

A pneumatic pan or pneumatic material discharge member is generally referred to by the reference character 34 and is provided on its bottom with a pair of transversely spaced slide strips 35 which are slidable on the tracks 18 of the side frame members 13. A downwardly extending flange 36 is provided at the end of the pan 34. A conventional pneumatic discharge tube or outlet 37 is provided for communication with the interior of the pan 34 and may be connected to a suitable source of vacuum for discharging materials. During nonuse caps 38 (only one of which is shown) are positioned over the ends of the outlet 37. As best shown in FIGS. 1 and 3 the pan 34 includes a dished portion 39 which in the closed position is disposed underneath the hopper so that materials may be discharged thereto. The pan 34 also includes a flat portion 40 connected to the dished portion as best shown in FIGS. 2, 5 and 6. The flat portion 40 includes an opening 41, best shown in FIGS. 5, 7 and 8. The opening 41 in the closed position of the pan 34 is adapted to register with a slot 42 formed in one of the tracks 18 of one of the side frame members 13 as best shown in FIG. 3. The pan 34 also has connected thereto a pair of depending plates 43 which have suitably connected thereto angle brackets 44. As best shown in FIG. 3 the angle bracket 44 on the right-hand side is provided with a vertically extending opening 45 which is adapted to register or be in vertical alignment with the openings 41 of the flat portion 40 and the slot 42 in the track 18. The angle bracket 44 is provided with three indentations or pockets 47 disposed beneath a rotating shaft 48 rotatably supported in openings 49 provided in the plates 43. The shaft 48 further is pivoted for rotation in openings 46 provided in the brackets 44.

A pair of end sleeves 50 are suitably pinned to opposite ends of the shaft 48 as indicated at 51. A handle 52 is also provided at opposite ends of the shaft 48 on the sleeve 50 to assist in manual rotation of said shaft. Indicator arms 53 are suitably connected to the sleeves 50 of the shaft 48 as best shown in FIGS. 5 through 8. A boss 54 is supported on each of the sleeves 50 and includes a bore 55 containing a spring-loaded ball assembly 56, the ball of the assembly adapted to be movably engaged within the pockets 47 for maintaining the shaft 48 in three indexed positions.

Referring particularly to FIG. 3 a sleeve 57 is pinned to the shaft 48 between the plates 43 and brackets 44. An arm 58 is suitably connected for rotation with the sleeves 57 and is pivotally connected as indicated at 59 to a vertical dog or pin 60. The pin 60 goes through a collar 61 supported on one bracket 44 and is adapted to move through the opening 45, the slot 42, and opening 41 of the pan 34 to lock the said pan in the closed position shown in FIGS. 3 and 8. Rotation of the shaft 48 provides for vertical movement of the pin 60 to the desired positions.

A sleeve 62, as best shown in FIGS. 3 and 6, is suitably pinned for rotation with the shaft 48 and includes an arm 63 which is pivotally connected as indicated at 64 to a dog or pin 65 which is movable through a collar 66 supported on the horizontal portion 40 of the pan 34 and is adapted to be moved through the opening 33 as shown in FIG. 6.

A locking arrangement is generally designated at 67 as best shown in FIGS. 3, 4 and 6. A flange 68 of the rear frame member 15 supports thereon a latch element 69 having a pivot member 70 suitably pivotally supported on pivot brackets 71 carried on the flange 68. The latch element 69 comprises a horizontal portion provided with an opening 72 and having on opposite sides thereof upwardly inclined portions 73 and 74. A sleeve or collar 75 is connected to the upwardly inclined portion 73 and supports a rod 76 in pivotal and slidable relation. A stop 77 is connected to one end of the rod 76 and the opposite end of the rod 76 has connected thereto a connecting arm 78 which supports in hairpin fashion, relative to the rod 76, a locking pin 79. The locking pin 79 in the lock position extends through an opening 80 provided in the upper end of the pin 65 as best shown in FIG. 6. An upwardly extending seal plate 81, as best shown in FIG. 5, is connected to the upwardly inclined portion 73 of the latch element 69. An upwardly extending seal plate 82 is connected to the connecting arm 78 as best shown in FIGS. 3 and 4 said seal plates being provided with openings 83 through which a car seal may be placed to seal the locking arrangement 67 in the lock position as shown in FIG. 6.

THE OPERATION

In FIGS. 1, 2 and 5 through 8, the gate 24 and pneumatic pan 34 are in the closed position underneath the discharge opening of the hopper 11. In the position of FIG. 6 the gate 24 and discharge pan 34 are in a locked position wherein, as indicated in FIG. 5, the shaft 48 has been moved to position the spring-loaded ball assembly 56 in one of the pockets 47. In this position the pin 65 has been moved upwardly, as indicated in FIG. 6 through the collar 66 and opening 33 and through the opening 72 of the latch element 69. The locking pin 79 is disposed in the opening 80 and thus the latch element 69 retains the gate 24 and discharge pan 34 in the lock position wherein the sealing member 28 seals the opening 27. In this position for transport a car seal also may be disposed in the openings 83 of the seal plates 81 and 82. When it is desired to release the locking arrangement 67 the car seal is removed and the locking pin 79 is moved to the right in FIGS. 3 and 4 until the stop 77 engages the collar 75 whereupon the locking pin 79 is free of the opening 80. The connecting arm 78 is now positioned in the position shown in FIG. 7. The shaft 48 is now rotated into the position shown in FIG. 7 wherein the pin 65 is still in engagement with the opening 33 of the gate 24. By actuating the pinions 30 in engagement with the rack 21, the gate 24 and pan 34 may now be moved to the left to one side of the discharge opening to the open position. Discharge of material is now effected by gravity from the hopper 11.

If it is desired to open only the gate 24 whereupon the pan 34 remains in position to receive material from the hopper for pneumatic discharge, the pin 65 is completely removed from the gate 24 as best shown in FIG. 8. In this position the indicator arm 53 is moved in a counterclockwise direction and the shaft 48 pivots to withdraw the pin 65 to the down position. In so doing the arm 58 moves the pin 60 upwardly through the slot 42 and into the opening 41 of the horizontal surface 40 of the discharge pan 34. The gate 24 is now disconnected from the pan 34 and may be withdrawn from the discharge opening to one side thereof underneath the racks 21. In so doing the seal element 28 engages the underneath side of the upwardly sloping surface 73 and the latch element 69 is momentarily moved upwardly or pivoted to permit the seal element 28 to pass thereunder.

Since the pin 60 is in engagement with the slot 42 of the surface 18 and also is in engagement with the opening 41 the pan is now held in a firmly locked position. Thus a suitable source of suction may now be applied to the pneumatic outlet 37 for removal of material. As shown in FIG. 8 the boss 54 is now in a position wherein the spring-loaded ball assembly 56 is in the right pocket 46. When the pneumatic unloading operation has been completed the gate 24 is again moved into the closed position wherein locking again may be accomplished as shown in FIG. 6.

In the position shown in FIG. 7 the pin 60 is disengaged and the pin 65 is in engagement with the gate 24 so that conjoint movement of the gate 24 and discharge pan 34 can be accomplished. The spring-loaded ball assembly 55 is in this position in the center pocket 47. During movement of the gate 24 to its closed position the upwardly extending sealing element 28 engages the underneath side of the upwardly inclined portions 74 to lift the latch element 69 upwardly momentarily until the seal passes thereunder into the sealing position shown in FIG. 6.

The indicating element 53 serves to indicate to the operator the particular relative position of the gate 24 and discharge pan 34. Selective indexing is easily accomplished by merely rotating the shaft 48 by means of the handle 52. Thus a single operating shaft easily manipulated by an operator permits the selective connection of the gates 24 and pan 34 relative to each other and into the locked positions as desired. The locking arrangement 67 is foolproof in that when the pin 79 is in engagement with the opening 80 there is no possibility of the gate 24 and discharge pan 34 being accidentally moved from the locked position such as could otherwise accidentally occur during train operation.

We claim:

1. A bottom outlet structure adapted to be secured beneath a hopper structure having a discharge opening for the discharge of material, comprising:

a frame disposed beneath said hopper structure including a pair of horizontally spaced track members supported on opposite sides of said discharge opening, a gate slidingly supported on said track members, means for moving said gate on said track members to open and closed positions relative to said discharge opening, a material discharge member including a pneumatic outlet supported on said track members movable to open and closed positions relative to said discharge opening, manually selectable indexing means between said gate and said material discharge member movable to one position and having means to selective interconnect said gate and discharge member for conjoint movement to an open position whereby lading is discharged by gravity, said selectable indexing means being movable to a second position and having means permitting movement of said gate to the open position independently of said discharge member and having means whereby said discharge member is locked beneath said discharge opening whereby material is discharged from said pneumatic outlet, and said selectable indexing means being movable to a third lock position and having means wherein said gate and discharge member are locked in closed position.

2. The invention according to claim 1, said indexing means comprising a rotatable member supported on said discharge member, dog means connected to said rotatable member and movable therewith to interconnect said gate and discharge member in said one position.

3. The invention according to claim 2, said gate having an opening and said dog means comprising a pin pivotally connected to said rotatable member and adapted to be moved into engagement with said opening.

4. The invention according to claim 3, wherein said pivotal connection of said dog means includes a lever arm connected to said rotatable member.

5. The invention according to claim 4, including a second dog means pivotally connected to said rotatable member, said frame having an opening and said second dog means being movable into said opening to lock said discharge member in the second position.

6. The invention according to claim 5, wherein said second dog means comprises a second pin and said pivotal connection of said second dog means includes a lever arm connected to said rotatable member.

7. The invention according to claim 6, comprising a locking member on said frame engageable by said first dog means in said third position.

8. The invention according to claim 7, said locking member including a latch element connected to said frame and having an opening engaged by said first pin.

9. The invention according to claim 8, said first pin having a transversely extending bore and a seal element extending through said bore to restrain withdrawal of said first pin from said opening of said latch element.

10. A bottom outlet structure adapted to be secured beneath a hopper structure having a discharge opening for the discharge of material, comprising:
a frame disposed beneath said hopper structure including a track,
a gate slidingly supported on said track,
means for moving said gate on said track between open and closed positions relative to said discharge opening,
a material discharge member including a pneumatic outlet supported on said track for movement to open and closed positions relative to said discharge opening,
manually operable selective indexing means adapted to connect said material discharge member to said gate for movement therewith including a rotatable member carried on said discharge member,
a lever arm connected to said rotatable member,
a pin pivotally connected to said arm and movable into registering engagement with an opening provided in said gate, and
latch means on said frame engageable with said pin for locking said gate and discharge member in the closed position.

11. The invention in accordance with claim 10, said latch means including a latch element pivotally connected to said frame,
said latch element including a horizontal portion provided with an opening through which said pin projects in said locking position and having on opposite sides of said horizontal portion upwardly inclined portions, and
projecting seal means on said gate for engaging a portion of said hopper to seal the same in the closed position of said gate, said seal means engaging said inclined portions during movement of said gate for pivoting said latch element to an out-of-the-way position.

12. The invention in accordance with claim 11, wherein said frame includes a transversely extending vertical opening through which said gate and discharge member moves,
said projecting seal being adapted in said closed position of said gate to seal a portion of said opening disposed between said frame and said gate.

13. The invention in accordance with claim 11, said latch means including a pivot bracket,
a locking member including a rotatable rod pivotally and slidably supported on said pivot bracket, and
a locking pin connected to said locking member and being insertable during rotating and sliding movement of said rod into an opening provided in said pin for maintaining the same in said registering engagement.

14. A bottom outlet structure adapted to be secured beneath a hopper structure having a discharge opening for the discharge of material, comprising:
means disposed beneath said hopper structure including track means supported on opposite sides of said discharge opening,
a gate slidingly supported on said track means,
means for moving said gate on said track means to open and closed positions relative to said discharge opening,
a material discharge member including a pneumatic outlet supported on said track means movable to open and closed positions relative to said discharge opening,
indexing means selectively connecting said gate with said discharge member and comprising:
first means for tying the gate and material discharge member together for conjoint longitudinal movement to an open position whereby lading is discharged by gravity,
second means for locking the gate and material discharge member together in closed position and preventing movement of the gate and material discharge member with respect to the hopper, and
third means for locking the material discharge member in the closed position for pneumatic unloading and releasing the gate so that the gate may be moved to an open position.